(12) United States Patent
Matsuzaki et al.

(10) Patent No.: US 7,784,494 B2
(45) Date of Patent: Aug. 31, 2010

(54) FLOW DIVIDER

(75) Inventors: Takeharu Matsuzaki, Kariya (JP); Shigeto Nakajima, Nagano (JP)

(73) Assignees: Kabushiki Kaisha Toyota Jidoshokki, Aichi-ken (JP); Nishina Industrial Co., Ltd., Nagano-ken (JP)

( * ) Notice: Subject to any disclaimer, the term of this patent is extended or adjusted under 35 U.S.C. 154(b) by 370 days.

(21) Appl. No.: 11/667,052

(22) PCT Filed: Nov. 8, 2005

(86) PCT No.: PCT/JP2005/020777

§ 371 (c)(1),
(2), (4) Date: Nov. 12, 2007

(87) PCT Pub. No.: WO2006/049345

PCT Pub. Date: May 11, 2006

(65) Prior Publication Data

US 2008/0276993 A1   Nov. 13, 2008

(30) Foreign Application Priority Data

Nov. 8, 2004   (JP) .............................. 2004-323233

(51) Int. Cl.
*F16K 11/07* (2006.01)
(52) U.S. Cl. .............................. 137/625.69; 137/115.13; 137/118.06; 137/119.06
(58) Field of Classification Search ............ 137/115.13, 137/118.01, 118.06, 119.01, 119.03, 119.08, 137/625.69
See application file for complete search history.

(56) References Cited

U.S. PATENT DOCUMENTS

| 2,919,679 | A | | 1/1960 | Lincoln et al. | |
|---|---|---|---|---|---|
| 3,355,994 | A | * | 12/1967 | Malott | ......................... 60/422 |
| 3,472,281 | A | | 10/1969 | Chiba et al. | |
| 3,914,939 | A | * | 10/1975 | Purdy | ......................... 60/422 |
| 3,916,932 | A | * | 11/1975 | Thorson | ..................... 137/101 |
| 4,488,569 | A | * | 12/1984 | Rau | ............................ 137/101 |

(Continued)

FOREIGN PATENT DOCUMENTS

EP   0 710 789   5/1996

(Continued)

OTHER PUBLICATIONS

European Office Action dated Aug. 7, 2008, in corresponding European Patent Application No. 05 803 417.4-2422 with English translation.

(Continued)

*Primary Examiner*—John K Fristoe, Jr.
(74) *Attorney, Agent, or Firm*—Locke Lord Bissell & Liddell, LLP

(57) ABSTRACT

A flow divider includes a spool for distributing fluid from a supply flow path to priority and surplus flow paths. First and second surplus restrictions vary flow rate in accordance with the movement of the spool and restrict the flow rate to the surplus flow path respectively from first and second supply passages. The second surplus restriction is formed to restrict the flow rate in at least two steps. The spool includes a cross-sectional area changing portion located at a position corresponding to the second surplus restriction. Therefore, the circuit structure is prevented from becoming complicated and the fluid force acting as a spool urging force is suppressed.

3 Claims, 3 Drawing Sheets

U.S. PATENT DOCUMENTS

| | | | |
|---|---|---|---|
| 4,616,671 A | 10/1986 | Steinkuhl et al. | |
| 5,682,744 A | 11/1997 | Hasegawa et al. | |
| 6,371,150 B1 * | 4/2002 | Shimada | 137/119.03 |
| 2004/0000347 A1 | 1/2004 | Shin et al. | |

FOREIGN PATENT DOCUMENTS

| | | |
|---|---|---|
| EP | 1 197 695 A2 | 4/2002 |
| FR | 2 573 841 | 5/1986 |
| GB | 1 476 401 | 6/1977 |
| JP | 53-116527 A | 10/1978 |
| JP | 60-99365 U | 7/1985 |
| JP | 60-159407 | 8/1985 |

OTHER PUBLICATIONS

International Search Report for corresponding International PCT application No. PCT/JP2005/020777, published as WO 2006/049345 A1 on May 11, 2006.

Office Action for corresponding Japanese patent application No. 2004-323233, dated May 18, 2010.

* cited by examiner

FLOW DIVIDER

FIELD OF THE INVENTION

The present invention relates to a flow rate switching type flow divider for supplying fluid from a pump at a predetermined flow rate to a priority flow circuit, while also supplying fluid through a tributary flow to a surplus flow circuit.

BACKGROUND OF THE INVENTION

In the prior art, known valves supply hydraulic oil from a pump to a priority flow circuit at a predetermined flow rate and supply the remaining oil to a surplus flow circuit. For example, Japanese Laid-Open Patent Publication No. 60-159407 describes a valve that distributes fluid supplied from a pump to a pilot circuit, which functions as a flow priority circuit, and an auxiliary circuit, which functions as a surplus flow circuit. The valve includes a spool hole and a spool accommodated in the spool hole. The spool hole, which functions as a fluid chamber, communicates with the pilot circuit, the auxiliary circuit, and a supply flow path. The fluid supplied from the pump flows through supply flow path to the spool hole. The supply flow path has three openings that communicate with the spool hole. This distributes the fluid from the supply flow path to two systems, that is, the surplus flow circuit and the flow priority circuit. A priority restriction for restricting the flow to the priority flow circuit and a surplus restriction for restricting the flow to the surplus flow circuit is formed between the spool and the wall surface of the spool hole.

In the valve of the above publication, fluid force from the fluid entering the priority flow circuit and urging the spool in the axial direction of the spool is balanced with fluid force of the fluid entering the auxiliary circuit and urging the spool in the axial direction of the spool. However, when the priority restriction formed between the spool and the wall surface of the spool hole causes a large pressure drop, the fluid forces are imbalanced. This increases the force applied in a direction from the priority restriction to the auxiliary restriction, that is, toward the pilot circuit (the direction indicated by arrow 97 in FIG. 2 of the above publication). In the valve, therefore, a circuit, which includes a pilot port, a check valve, and an orifice, are formed to apply force, which offsets the spool urging force produced by fluid force, to one end of the spool.

However, with the valve of the above publication, a more complex circuit structure becomes necessary to optimally offset the spool urging force with fluid force.

SUMMARY OF THE INVENTION

It is an object of the present invention to provide a flow divider that prevents the circuit structure from becoming complicated and suppresses the fluid force acting as a spool urging force.

One aspect of the present invention is a flow divider for distributing fluid supplied from a pump to a priority flow circuit and a surplus flow circuit. The flow divider is provided with a housing including a pump port connectable to the pump, a priority flow port connectable to the priority flow circuit, a surplus flow port connectable to the surplus flow circuit, a supply flow path communicated with the pump port, a priority flow path communicated with the priority flow port, a surplus flow path communicated with the surplus flow port, and a spool hole defined by a wall surface and communicated with the supply flow path, the priority flow path, and the surplus flow path. A spool, which is arranged in the spool hole in an axially movable manner, distributes fluid from the supply flow path to the priority flow path and the surplus flow path. A surplus restriction, which is defined by the spool and the wall surface of the spool hole, restricts flow rate of the fluid from the supply flow path to the surplus flow path. The supply flow path includes a first supply passage and a second supply passage branched from each other and communicated with the spool hole. The surplus restriction is a variable restriction, for varying the flow rate in accordance with the movement of the spool, and includes a first surplus restriction, for restricting the flow rate from the first supply passage to the surplus flow path, and a second surplus restriction, for restricting the flow rate from the second supply passage to the surplus flow path. The second surplus restriction is formed to restrict the flow rate in at least two steps. The spool includes a cross-sectional area changing portion located at a position corresponding to the second surplus restriction.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A preferred embodiment of the present invention will now be described hereinafter with reference to the drawings. The flow rate switching type flow divider of the present invention may be widely used for applications in which fluid from a pump is distributed to a priority flow circuit at a predetermined flow rate and to a surplus flow circuit. The flow rate switching type flow divider 1 may be applied to, for example, a forklift so as to distribute hydraulic oil supplied from a pump to a hydraulic power steering device, which functions as a priority flow circuit, and to a load circuit, which functions as a surplus flow circuit. The flow rate switching type flow divider 1 is not necessarily limited to the above application. For example, the present invention may be applied to a forklift that uses other hydraulic circuits as the priority flow circuit and surplus circuit. The present invention may also be used to control hydraulic circuits of equipment other than forklifts.

Figure 1:
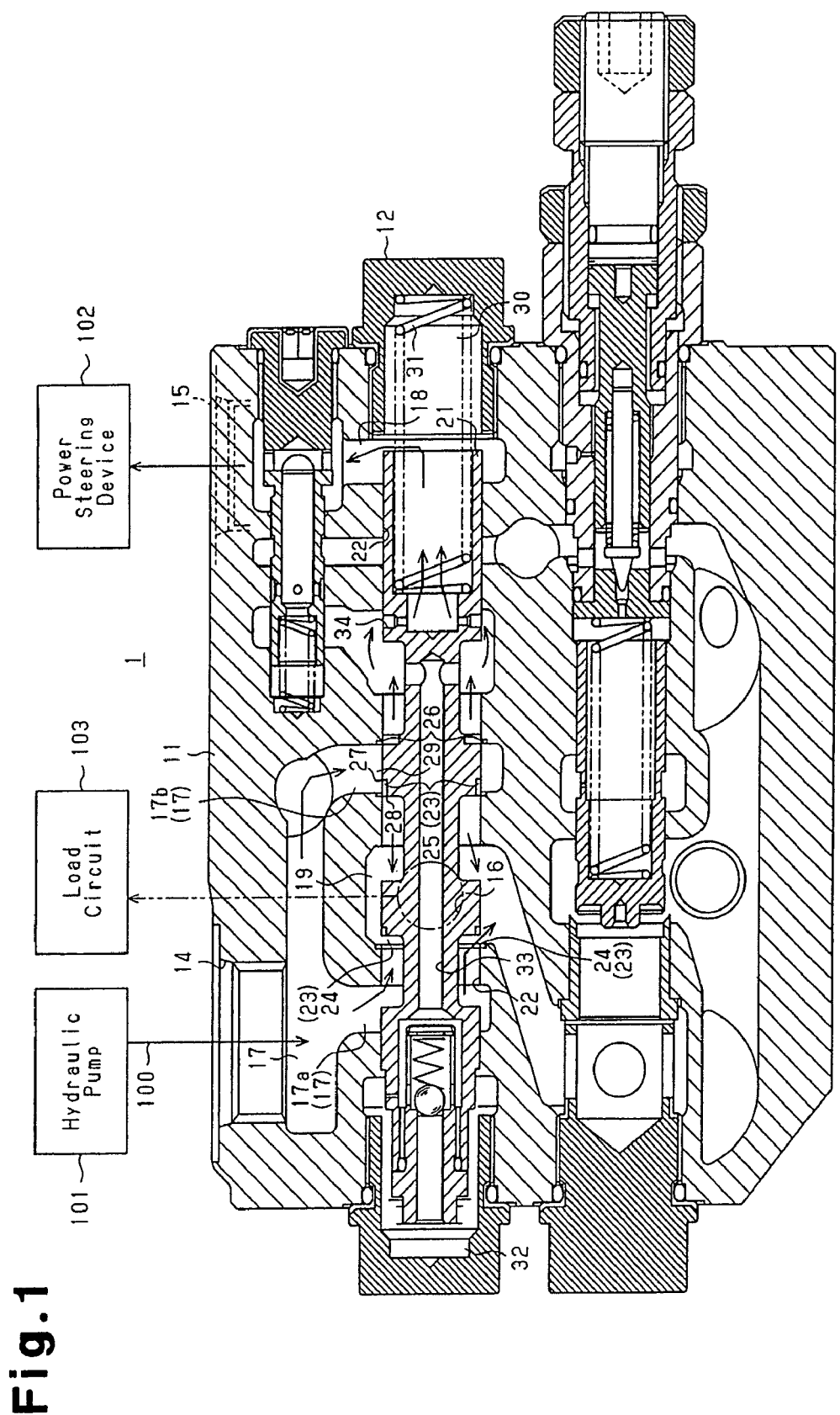
FIG. 1 is a cross-sectional view showing a flow divider according to a preferred embodiment of the present invention in a state in which the opening amount of a surplus restriction is large and the opening amount of a priority restriction is small.

FIG. 1 is a cross-sectional view of the flow rate switching type flow divider 1. The flow rate switching type flow divider 1 functions as part of a hydraulic pressure circuit 100 in a forklift. The flow divider 1 distributes hydraulic oil, which functions as an operating fluid, supplied from a hydraulic pump 101 to a hydraulic power steering device 102, which functions as a priority flow circuit, and to a load circuit 103, which functions as a surplus flow circuit. The flow rate switching type flow divider 1 shown in FIG. 1 includes a housing 11 and a flow divider valve 12, which is incorporated in the housing 11. FIG. 1 shows the flow rate switching type flow divider 1 in a neutral state, in which the power steering device 102 and load circuit 103 are de-actuated, that is, not operated by the operator.

As shown in FIG. 1, a plurality of ports, such as a pump port 14, a priority flow port 15, and a surplus flow port 16, are formed in the housing 11 so as to open to the exterior. The pump port 14 is connected to a downstream end of the hydraulic pump 101, which supplies hydraulic oil in the forklift. In the same manner, the priority flow port 15 and surplus flow port 16 are respectively connected to the power steering device 102 and the load circuit 103 in the forklift. The load circuit 103 functions as a circuit for controlling actuation of hydraulic actuators related with the lifting of loads. In FIG. 1, the surplus flow port 16, which is indicated by the double-dotted line, is formed so as to open at a position above the cross-sectional plane shown in FIG. 1. In the following description, the pump port 14 is located in an upstream part of the hydraulic pressure circuit 100, and the priority flow port 15 and surplus flow port 16 are located in a downstream part of the hydraulic pressure circuit 100.

The housing 11 includes the supply flow path 17, the priority flow path 18, and the surplus flow path 19, which form a passage through which hydraulic oil from the hydraulic pump 101 flows. The supply flow path 17 has an upstream end communicating with the pump port 14 and a downstream end communicating with the flow divider valve 12. The priority flow path 18 has an upstream end communicating with the flow divider valve 12 and a downstream end communicating with the priority flow port 15. The priority flow port 15 communicates with the priority flow path 18 at a position under the plane of FIG. 1. The surplus flow path 19 has an upstream end communicating with the flow divider valve 12 and a downstream end communicating with the surplus flow port 16.

The flow divider valve 12 includes a spool 21, a spool hole 22, a surplus restriction 23, and a priority restriction 26. The flow divider valve 12 distributes the hydraulic oil from the supply flow path 17 to the priority flow path 18 and the surplus flow path 19. The arrows shown in FIGS. 1 to 3 indicate the flow direction of the hydraulic oil supplied from the pump port 14.

The spool hole 22 of the flow divider valve 12 communicates with the supply flow path 17, the priority flow path 18, and the surplus flow path 19. The spool 21 is movably arranged in the spool hole 22. The spool 21 moves in the direction of the spool axis L in the spool hole 22 to adjust the distribution of the hydraulic oil from the supply flow path 17 to the priority flow path 18 and the surplus flow path 19. Further, the supply flow path 17 includes a first supply passage 17a and a second supply passage 17b, which communicate with the spool hole 22. Thus, the supply flow path 17 is divided into two systems, the first supply passage 17a and the second supply passage 17b, which respectively supply hydraulic oil to the surplus flow path 19. The upstream end of the surplus flow path 19 communicates with the spool hole 22 between the first supply passage 17a and the second supply passage 17b in the direction of the axis L of the spool 21. Further, the upstream end of the priority flow path 18 communicates with the downstream end of the spool hole 22. The spool 21 includes a fixed restriction 34, which is downstream of the second supply passage 17b, and a spring chamber 30, which is downstream of the fixed restriction 34. The second supply passage 17b communicates with the priority flow path 18 via the fixed restriction 34 and the spring chamber 30.

The surplus restriction 23 and the priority restriction 26 of the flow divider valve 12 are both formed by the spool 21 and the wall surface of the spool hole 22. The surplus restriction 23 restricts the flow rate of the hydraulic oil from the supply flow path 17 to the surplus flow path 19. The priority restriction 26 restricts the flow rate of the hydraulic oil from the supply flow path 17 to the priority flow path 18.

The surplus restriction 23 is a variable restriction that varies the flow rate of hydraulic oil from the supply flow path 17 to the surplus flow path 19 in accordance with the movement of the spool 21 in the spool hole 22. The surplus restriction 23 includes a first surplus restriction 24 and a second surplus restriction 25. The first surplus restriction 24 restricts the flow rate of hydraulic oil from the first supply passage 17a to the surplus flow path 19. The second surplus restriction 25 restricts the flow rate of hydraulic oil from the second supply passage 17b to the surplus flow path 19. The first and second surplus restrictions 24 and 25 simultaneously restrict the flow rate of the hydraulic oil flowing therethrough in accordance with the movement of the spool 21.

A first surplus recess 41, which communicates with the first supply passage 17a, and a second surplus recess 42, which communicates with the second supply passage 17b, is formed in the outer surface of the spool 21. In other words, the spool 21 includes a first land 50, which is located between the first surplus recess 41 and the second surplus recess 42, and a second land 52, which corresponds to the second supply passage 17b. A surplus flow path formation groove 43, which communicates with the first surplus recess 41 and the second surplus recess 42, is formed in the wall surface of the spool hole 22. The surplus flow path formation groove 43 forms part of the surplus flow path 19. The first surplus restriction 24 is defined between the first surplus recess 41 and the surplus flow path formation groove 43. The first surplus recess 41 includes surfaces that are orthogonal to the spool axis L, one of which functions as an upstream first pressure receiving portion 21a and the other of which functions as a downstream second pressure receiving portion 21b. Further, the second surplus recess 42 includes surfaces that are orthogonal to the spool axis L, one of which functions as a downstream third pressure receiving portion 21c and the other of which functions as an upstream fourth pressure receiving portion 21d. The spool 21 includes a second surplus restriction formation portion 51, which functions as a cross-sectional area changing portion and forms the second surplus restriction 25.

Figure 2:
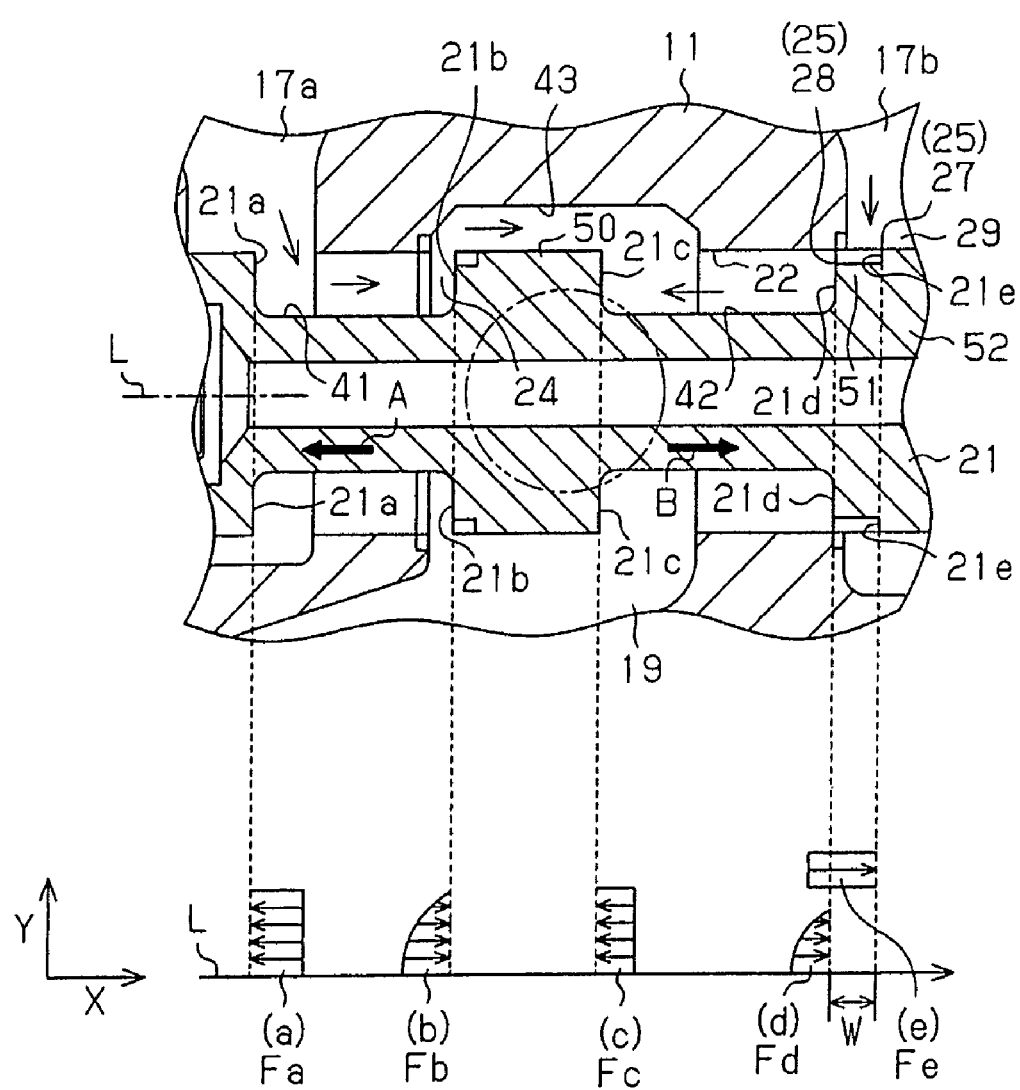
FIG. 2 is an enlarged partial cross-sectional view of the flow divider shown in FIG. 1.

In FIG. 2, the upper half is an enlarged partial cross-sectional view of the flow divider 1. The second surplus restriction 25 restricts the flow rate in two steps in accordance with the change in the cross-sectional area of the spool 21. That is, the second surplus restriction formation portion 51 of the spool 21 has two steps that are formed so that the diameter of the spool 21 decreases from the second supply passage 17b to the surplus flow path 19. In this manner, the second surplus restriction 25 is defined by the spool 21 and restricts the flow rate in two steps. More specifically, the second surplus restriction formation portion 51 of the spool 21 increases a first step 27 and a second step 28, which is arranged closer to the surplus flow path 19 than the first step 27. In other words, the first step 27 is located closer to the second supply passage 17b than the second step 28. The diameter at the second step 28 is smaller than that at the first step 27. The surface of the second step 28 that is orthogonal to the spool axis L functions as the fourth pressure receiving portion 21d. The surface of the first step 27 that is orthogonal to the spool axis L functions as a fifth pressure receiving portion 21e.

Figure 3:
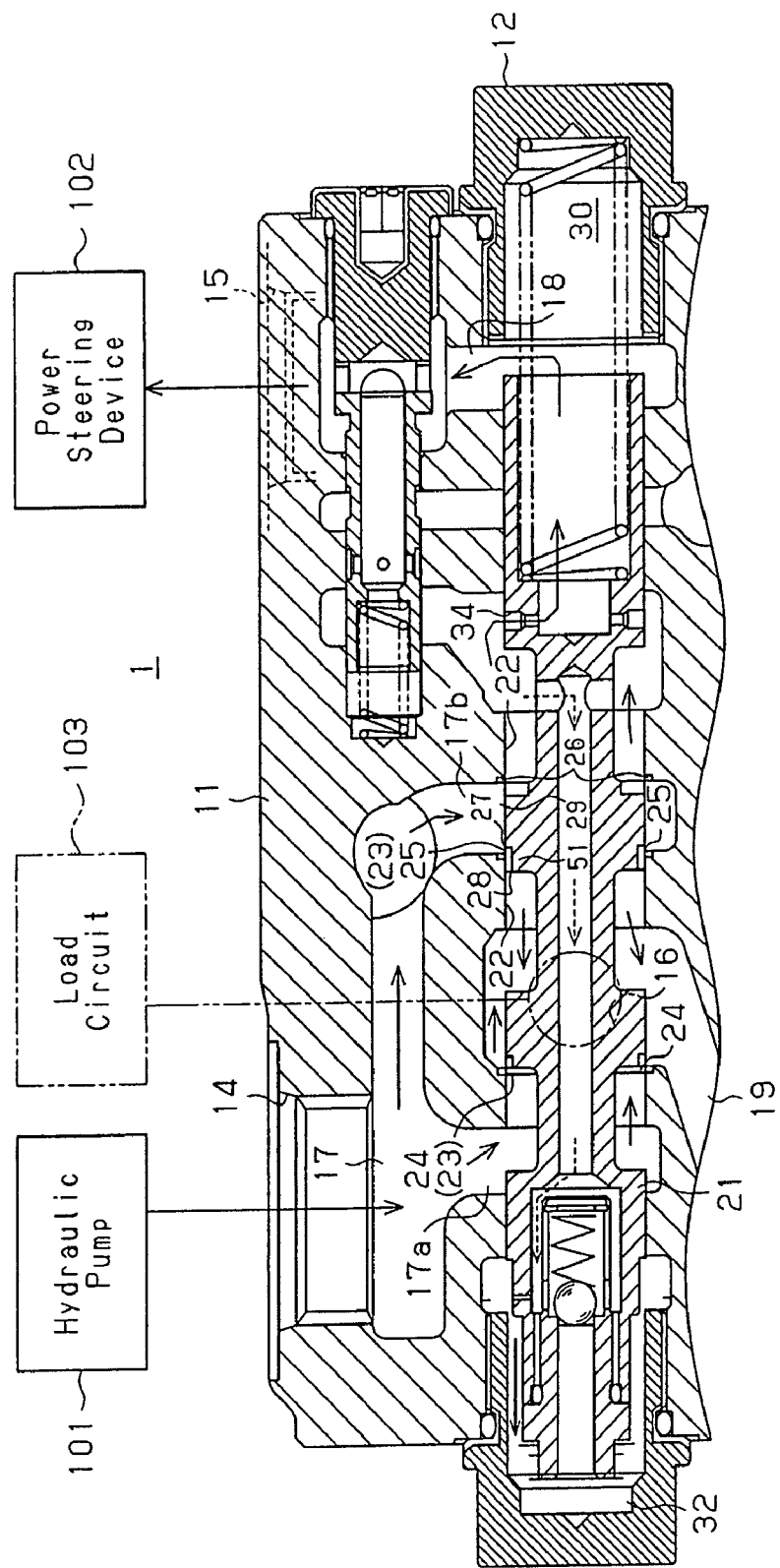
FIG. 3 is an enlarged partial cross-sectional view of the flow divider shown in FIG. 1 in which the opening amount of the surplus restriction is small and the opening amount of the priority opening is large.

FIG. 3 is a partial cross-sectional view showing the spool 21 in a state shifted from the position of FIG. 1. FIGS. 1 and 2 show the surplus restriction 23 in a state in which the open amount is large and the priority restriction 26 in a state in which the open amount is small. FIG. 3 shows the surplus restriction 23 in a state in which the open amount is small and the priority restriction 26 in a state in which the open amount is large. The downstream end of the second supply passage 17b in communication with the spool hole 22 is referred to as a downstream end opening 29. As shown in FIGS. 1 to 3, the second step 28 is constantly separated from the downstream end opening 29 of the second supply passage 17b with respect to the spool axis L. Further, even if the spool 21 moves, the first step 27 is always opposed to the downstream end opening 29 of the second supply passage 17b. In other words, the distance W between the first step 27 and the second step 28 in the direction of the spool axis L is set to be greater than the movement amount of the spool 21. Such layout of the first step 27 and the second step 28 restricts the flow rate of hydraulic oil from the second supply passage 17b to the surplus flow path 19 in two steps regardless of the position of the spool 21.

The operation of the flow divider 1 will now be described. The flow divider 1 distributes the hydraulic oil from the hydraulic pump 101 to the power steering device 102 at a predetermined flow rate and to the load circuit 103. The distribution of the hydraulic oil is performed by actuating the flow divider valve 12. The flow divider valve 12 has a right end including the spring chamber 30 and a spring 31 and a left end including a pilot chamber 32. A pilot passage 33 extends through the spool 21 to guide the hydraulic oil, downstream of the priority restriction 26, to the pilot chamber 32. The spool 21 includes the fixed restriction 34, which is downstream of the priority restriction 26, to further restrict the flow rate of the hydraulic oil. The hydraulic oil directed through the fixed restriction 34 flows into the spring chamber 30 and then into the priority flow path 18. The pilot chamber 32 is upstream of the fixed restriction 34, and the spring chamber 30 is downstream of the fixed restriction 34. Thus, the hydraulic pressure of the pilot chamber 32 is greater than that of the spring chamber 30. The difference between the hydraulic pressure of the spring chamber 30 and the hydraulic pressure of the pilot chamber 32 generates an urging force that urges the spool 21 toward the spring chamber 30, or to the right as viewed in FIG. 1. The spool 21 is held in a balanced state at a position in which the urging force generated by the pressure difference between the spring chamber 30 and the pilot chamber 32 is balanced with the urging force of the spring 31 that acts in the opposite direction.

The balanced state collapses when actuation of the power steering device 102 or the load circuit 103 fluctuates the hydraulic pressure of the spring chamber 30 or pilot chamber 32. This moves the spool 21 so as to return to the balanced state. The movement of the spool 21 varies the open amount of the surplus restriction 23 and the priority restriction 26. This supplies the priority flow path 18 with hydraulic oil at a predetermined flow rate and varies the flow rate of hydraulic oil directed to the surplus flow path 19. A change in the load state of the power steering device 102 changes the hydraulic pressure of the spring chamber 30 through the priority flow path 18. Further, a change in the load state of the load circuit 103 changes the hydraulic pressure of the pilot chamber 32 through the surplus flow path 19, the surplus restriction 23, the second supply passage 17b, the priority restriction 26, and the pilot passage 33. The supply of hydraulic oil to the priority flow path 18 at a predetermined flow rate is adjusted by the fixed restriction 34, which functions as an orifice formed in the spool 21.

The operation of the surplus restriction will now be described. The lower half of FIG. 2 corresponds to the cross-sectional view in the upper half of FIG. 2 and shows the distribution of fluid force that acts on the spool 21. In the fluid force distribution chart, the length in the X axis direction represents the magnitude of the fluid force. Further, the length in the Y axis direction represents the fluid force distribution in the radial direction of the spool 21. First to fifth fluid distributions (a) to (e) respectively correspond to the first to fifth pressure receiving portions 21a to 21e, which are orthogonal to the axial direction of the spool 21. Fluid force in the direction of the spool axis L, or the direction of the X axis, acts on the first to fifth pressure receiving portions 21a to 21e in the circumferential direction.

Referring to FIGS. 2 and 3, the flow path is not restricted in the vicinity of the first pressure receiving portion 21a, which is upstream of the first surplus restriction 24. Thus, there is no vena contracta. The first fluid distribution (a) acts on the first pressure receiving portion 21a in the direction of arrow A, that is, in the negative direction of the X axis. Vena contracta may occur in the vicinity of the second pressure receiving portion 21b, which corresponds to the first surplus restriction 24. As shown in the state of FIG. 3, vena contracta occurs when the spool 21 moves and restricts the flow rate of the hydraulic oil, that is, when the pressure drop at the first surplus restriction is large. When such vena contracta occurs, the second fluid force distribution (b) of the fluid force, which is smaller than the first fluid force distribution (a), acts on the second pressure receiving portion 21b in the direction of arrow B in FIG. 2, that is, in the positive direction of the X axis. When the magnitude of the fluid force acting on the first pressure receiving portion 21a is represented by Fa and the magnitude of the fluid force acting on the second pressure receiving portion 21b is represented by Fb, the relationship of formula (1) is satisfied. Thus, in accordance with the relationship of formula (1), the first pressure receiving portion 21a and the second pressure receiving portion 21b produces fluid force that urges the spool 21 in the direction of arrow A, or in the negative direction of the X axis.

$$Fa > Fb \tag{1}$$

As described above, the second surplus restriction 25 is arranged in the spool 21 to restrict the flow rate of the hydraulic oil when the first surplus restriction 24 restricts the flow rate in accordance with the movement of the spool 21. Thus, as shown in the state of FIG. 3, when the first surplus restriction 24 restricts the flow rate of the hydraulic oil, the second surplus restriction 25 also restricts the flow rate. In other words, the hydraulic pressure at the second surplus recess 42 and the surplus flow path formation groove 43 is less than the hydraulic pressure at the first surplus recess 41 and the downstream end opening 29. The third fluid force distribution (c) of the restricted flow rate is applied in the direction of arrow A to the third pressure receiving portion 21c, which is downstream of the first surplus restriction 24 and the second surplus restriction 25. In this state, vena contracts occurs in the vicinity of the second step 28 that corresponds to the second surplus restriction 25. Thus, the fourth fluid distribution (d) that is smaller than the third fluid distribution (c) acts in the direction of arrow B. The flow rate is restricted at the first step 27 of the second surplus restriction 25. The flow rate of the hydraulic oil is restricted at the first step 27 of the second surplus restriction 25. However, the open amount is still sufficiently wide, and there is practically no vena contracta. Thus, the first fluid distribution (e), which is not significantly affected by vena contracts, is applied in the direction of arrow B to the fifth pressure receiving portion 21e, which corresponds to the first step 27. That is, the fifth pressure receiving portion 21e receives fluid force Fe acting in a direction from the surplus flow path 19 to the second surplus restriction 25. When the fluid force applied to the third, fourth, and fifth pressure receiving portions 21c, 21d, and 21e are respectively represented by Fc, Fd, and Fe, the relationship of formula (2) is satisfied. Thus, in accordance with the relationship of formula (2), the third to fifth pressure receiving portions 21c to 21e act to urge the spool 21 in the direction of arrow B, or in the positive direction of the axis X.

$$Fc < Fd + Fe \tag{2}$$

In this manner, fluid force is applied to the first and second pressure receiving portions 21a and 21b of the spool 21 in the direction of arrow A, and fluid force is applied to the third to fifth pressure receiving portions 21c to 21e of the spool 21 in the direction of arrow B. Thus, the fluid force applied to the spool 21 by the first and second pressure receiving portions 21a and 21b and the fluid force applied to the spool 21 by the third to fifth pressure receiving portions 21c to 21e offset each other. In other words, the fluid force urging the spool 21 and generated by the hydraulic oil that flows from the supply flow path 17 via the first surplus restriction 24 and into the surplus flow path 19 is offset with the fluid force urging the spool 21 and generated by hydraulic oil that flows from the supply flow path 17 via the second surplus restriction 25 and into the surplus flow path 19. Thus, the fluid force applied to the spool 21 by the hydraulic oil supplied from the supply flow path 17 to the surplus flow path 19 is reduced.

The flow divider 1 has the advantages described below.

(1) The hydraulic pressure from the supply flow path 17 is supplied via the first surplus restriction 24 to the surplus flow path 19 and supplied via the second surplus restriction 25 to the surplus flow path 19. Fluid force is applied to each of the first and second pressure receiving portions 21a and 21b, which are related with the first surplus restriction, and the third to fifth pressure receiving portions 21c to 21e, which are related with the second surplus restriction 25. When the spool 21 moves to the left and increases the pressure drop at the surplus restriction 23, which includes the first surplus restriction 24 and the second surplus restriction 25, vena contracta occurs at each of the first surplus restriction 24 and the second surplus restriction 25. As a result, the fluid force urging the spool 21 in the direction of axis L varies and changes the balanced state of the spool 21.

However, the second surplus restriction 25 differs from the first surplus restriction 24 and has a structure for restricting the flow rate of the hydraulic oil in steps in accordance with the second surplus restriction formation portion 51, which functions as the cross-sectional area changing portion of the spool 21. Thus, the second surplus restriction 25 differs from the second pressure receiving portion 21b of the first surplus restriction 24, which is entirely affected by vena contracta in the radial direction of the spool 21, in that vena contracta affects only the fourth pressure receiving portion 21d of the second surplus restriction 25. As a result, the fifth pressure receiving portion 21e of the second surplus restriction that is not significantly affected by vena contracts generates force Fe in the opposite direction to suppress the fluid force Fa that moves the spool 21 to the left.

Thus, the urging force applied to the spool 21 by the fluid force Fa is offset, and the movement of the spool in the direction of the axis L is suppressed. The simple structure of the surplus restriction 23 suppresses the movement of the spool 21 in one direction when the fluid force changes at the surplus restriction 23, which simultaneously reduces the open amount of the first surplus restriction 24 and the second surplus restriction 25. Accordingly, if the pressure drop at the surplus restriction 23 is large, the urging force of the spool 21 generated by the fluid force Fa is suppressed. Further, the circuit structure of the flow divider is prevented from being complicated.

(2) In the flow divider 1, the second surplus restriction 25 is formed by a simple structure in which the diameter of the spool 21 is reduced in a stepped manner by the first step 27 and the second step 28. Thus, even if vena contracta occurs at the second step 28, the first step 27 is substantially unaffected. This simplifies the structure of the second surplus restriction that restricts the flow rate of the hydraulic oil in two steps to offset the urging force of the spool 21 generated by fluid force.

(3) The second step 28 is constantly located at a position separated from the downstream end opening 29 of the second supply passage. Further, the spool 21 is movable in a state in which the first step 27 is constantly opposed to the downstream end 29 of the second supply passage 17b. Accordingly, even if vena contracta occurs at the second step 28 of the second surplus restriction 25, the spool 21 may be moved to vary the open amount of the surplus restriction 23 while maintaining a state in which vena contracta does not significantly affect the first step 27. This suppresses the urging force of the spool 21 generated by fluid force in the large movable range of the spool even if the pressure drop at the surplus restriction 23 is large.

It should be apparent to those skilled in the art that the present invention may be embodied in many other specific forms without departing from the spirit or scope of the invention. Particularly, it should be understood that the present invention may be embodied in the following forms.

(1) In the preferred embodiment, the second surplus restriction 25 restricts the flow rate of hydraulic oil in two steps. However, the present invention is not limited to such a structure. For example, the second surplus restriction may be structured to restrict the flow rate in three or more steps.

(2) In the preferred embodiment, the second surplus restriction 25 has a stepped shape and includes the first step 27 and the second step 28. However, the present invention is not limited to such form. Various shapes may be selected to form a second surplus restriction that restricts the flow rate in two steps. For example, the first step 27 may be inclined and be combined with the remaining second step 28.

(3) The shape of the portion of the spool 21 defining the first surplus restriction 24 is not limited to that of the preferred embodiment. For example, a notch may be partially formed in the spool 21 to form the second surplus restriction formation portion 51. The notch does not have to be stepped throughout the entire circumference of the spool 21 and may be formed by partially cutting out the spool 21.

The present examples and embodiments are to be considered as illustrative and not restrictive, and the invention is not to be limited to the details given herein, but may be modified within the scope and equivalence of the appended claims.

The invention claimed is:

1. A flow divider for distributing fluid supplied from a pump to a priority flow circuit and a surplus flow circuit, the flow divider comprising:

a housing including a pump port connectable to the pump, a priority flow port connectable to the priority flow circuit, a surplus flow port connectable to the surplus flow circuit, a supply flow path communicated with the pump port, a priority flow path communicated with the priority flow port, a surplus flow path communicated with the surplus flow port, and a spool hole defined by a wall surface and communicated with the supply flow path, the priority flow path, and the surplus flow path;

a spool, arranged in the spool hole in an axially movable manner, for distributing fluid from the supply flow path to the priority flow path and the surplus flow path;

a surplus restriction, defined by the spool and the wall surface of the spool hole, for restricting flow rate of the fluid from the supply flow path to the surplus flow path, wherein the supply flow path includes a first supply passage and a second supply passage branched from each other and communicated with the spool hole;

the surplus restriction is a variable restriction, for varying the flow rate in accordance with the movement of the spool, and includes a first surplus restriction, for restricting the flow rate from the first supply passage to the surplus flow path, and a second surplus restriction, for restricting the flow rate from the second supply passage to the surplus flow path, the second surplus restriction being formed to restrict the flow rate in at least two steps; and the spool including a cross-sectional area changing portion located at a position corresponding to the second surplus restriction;

wherein the cross-sectional area changing portion has a diameter that is reduced from the second supply passage toward the surplus flow path, wherein the spool has a cross-sectional area that changes in a stepped manner at the cross-sectional area changing portion, wherein the second surplus restriction includes a first step and a second step arranged closer to the surplus flow path than the first step, and the cross-sectional area of the spool at a portion corresponding to the second step is less than the cross-sectional area of the spool at a portion corresponding to the first step, wherein the first step and the second step restrict the flow rate of the fluid from the second supply flow path to the surplus flow path, respectively; and wherein the second step restricts the flow rate of the fluid from the second supply passage to the surplus flow path when the flow path between the second step and a wall of the spool hole is narrower than the flow path between the first step and the wall of the spool hole, wherein when the open amount of the second surplus restriction is sufficiently wide, the open amount of the second step is narrower than the open amount of the first step.

2. The flow divider according to claim 1, wherein the second supply passage has an opening communicated with the spool hole, and the spool is movable in a range in which the second step is spaced from the opening of the second supply passage and the first step faces toward the opening.

3. The flow divider according to claim 1, wherein the cross-sectional area changing portion includes a pressure receiving surface for receiving fluid force acting in a direction from the surplus flow path to the second surplus restriction.

* * * * *